March 25, 1969 E. SENNHENN 3,435,359

VIDEO SIGNAL LEVEL CONTROL CIRCUIT

Filed June 8, 1966

Inventor:
Emil Sennhenn by Michael J. Striker
Attorney

United States Patent Office 3,435,359
Patented Mar. 25, 1969

3,435,359
VIDEO SIGNAL LEVEL CONTROL CIRCUIT
Emil Sennhenn, Darmstadt-Arheilgen, Germany, assignor to Fernseh G.m.b.H., Darmstadt, Germany
Filed June 8, 1966, Ser. No. 556,174
Claims priority, application Germany, July 13, 1965, F 46,583
Int. Cl. H03f *3/04, 3/68;* H03g *3/20*
U.S. Cl. 330—22 9 Claims

ABSTRACT OF THE DISCLOSURE

A variable control voltage is applied, by way of balanced resistors, to the emitters of a first pair of emitter-coupled transistors. Video input signals are applied to one base and the other base is grounded. The collectors are capacitively coupled to the bases of a second pair of emitter-coupled transistors. The video output signal derived at one collector of the second pair of transistors varies in level as the control voltage is varied, but no alteration of the direct current component of the video signal takes place.

Figure 1:
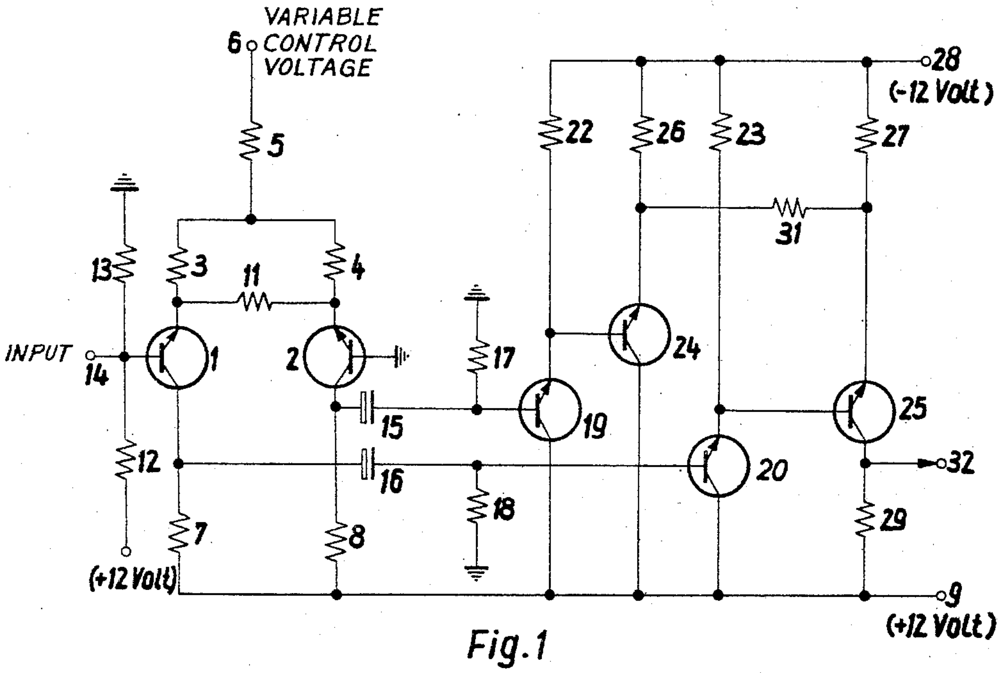

This invention relates to a circuit arrangement for controlling the level of video signals.

The basic object of the present invention is to provide a circuit arrangement for controlling the level of video signals which on the one hand will fulfill exacting requirements as regards linearity and on the other hand will respond to rapid alterations in the level of the video signal without giving rise to distortion.

It is well known that particularly exacting requirements as regards linearity are demanded in the sphere of television technology, since non-linear distortion (differential amplitude distortion) of the video signal results in an alteration of the gradation of the brightness values in the picture. Non-linear distortion is in principle inseparable from the employment of gain-controlled amplifiers. Its magnitude is dependent upon the form of the transmission characteristic of the amplifiers and upon the input level of the video signal. In order to meet the exacting requirements as to linearity, it becomes necessary, when a single-stage variable-gain amplifier is employed, to apply the video signals to this amplifier at a very low input level. This is often undesirable when a relatively high signal voltage, for example of the standard level of 1 $v._{pp}$, is to be handled by the amplifier. In such a case the level of the video signal must be reduced before it is applied to the amplifier and must be raised after the amplifier, which results in increased cost of the apparatus.

By making use of a known circuit arrangement with two amplifier tubes coupled by a common cathode impedance the above-mentioned disadvantages of single-stage variable-gain amplifiers may be reduced. The gain is then altered to an equal amount by each of the two amplifier stages simultaneously. Since the video signal is applied to the two amplifier stages in opposite phases, the non-linear distortion resulting from the non-linear transmission characteristics of the two amplifier stages is self-cancelling. Exact compensation only occurs, however, when the modulating voltage is the same for the two amplifier stages, which is only approximately attained with a very high common cathode impedance for the two amplifier tubes. Since in practice this cathode impedance cannot be made particularly high, the modulating voltage for the second amplifier valve (of the two cathode-coupled amplifiers) is less than that of the first amplifier stage, so that the range of modulation on the transmission characteristic of the first amplifier stage is greater than that in the second stage. The non-linear distortion produced by the two stages is therefore different, and is therefore only partially self-cancelling, so that the output signal still contains substantial non-linear distortion.

A further disadvantage of this known circuit arrangement is to be seen therein, that in response to a rapid change in the control voltage not only does the level of the video signal alter, but also its direct-current component. This is because the controlled video signal must first be amplified in an amplifier before it can be applied to a device known as a clamp circuit which restores the alteration of the direct-current component effected by the gain-control circuits. The amplifier, which is situated between the gain-controlling circuit arrangement and the clamp circuit may be over-modulated by the undesired alteration of the direct-current components, so that a temporary loss of the video signal, or at least a very disturbing amplitude limiting of the pulse peaks of the video signal may arise.

In order to reduce the differential amplitude distortion resulting from the use of the known circuit arrangements, in another known circuit arrangement the controlling voltages applied to the grids of two cathode-coupled tubes are of different amplitudes. Thus the smaller controlling voltage (for the first amplifier stage) and the larger controlling voltage (for the second amplifier stage) differ such that the non-linear distortions (occasioned by the finite value of the common cathode impedance and through the different modulation ranges of the two amplifier stages which are thus employed) are of approximately equal magnitude. In this manner there may be taken from the anodes of the two amplifier tubes which contains only negligible non-linear distortion. Also in this further known circuit arrangement the antiphased video signals taken from the anodes are each applied to the control grid of one of two further cathode-coupled amplifier valves. The antiphased video signals are thus added and alterations in the direct-current component are rendered ineffective in so far as they are transmitted over the two amplifiers at the same amplitude. Despite this there results in this further known circuit arrangement, in response to rapid alterations of the control voltage, abrupt alterations of the video signal, since the control voltages applied to the two control grids have different amplitudes, so that the direct current components of the video signals provided at the two anodes, although they both change in the same direction, change by different amounts. Thus the alterations of different magnitude in the direct current components cannot be made ineffective by the subsequent additional cathode-coupled amplifier stage.

The purpose of the invention is to provide a novel combination of circuit means forming a circuit arrangement which avoids the disadvantages of the known circuit arrangements. The invention also endeavours to provide a circuit arrangement in which semi-conductor components, preferably transistors, are employed in place of the amplifier tubes of the known circuit arrangements.

According to the present invention there is provided a circuit arrangement for varying the level of a video signal in response to changes in an applied control voltage, in which the control voltage is applied by way of respective resistors of equal value to the emitters of a pair of emitter-coupled transistors, the video signal being applied to the base of one said transistor and the base of the other said transistor being held at a constant potential, and in which antiphased signals appearing at the collectors of said transistors are applied respectively to the bases of a further pair of emitter-coupled transistors, whereby there appears across a load resistor in the collector circuit of one said further transistor a signal of which the level is determined by the magnitude of said control voltage.

The circuit arrangement according to the invention is characterized by an extraordinarily low level of non-linear distortion in the controlled signal, and by responding to rapid alterations of the control voltage, in particular, a train of sawtooth voltage impulses with a repetition rate of 50 c./s., without the appearance of transients in the output signal. Thus the circuit arrangement according to the invention is suitable for the multiplicative mixing of a video signal with a signal which is applied to the circuit as a control voltage. The circuit arrangement according to the invention is suitable both for manual and for automatic gain control and for the remote control of the level of a video signal.

Figure 2:
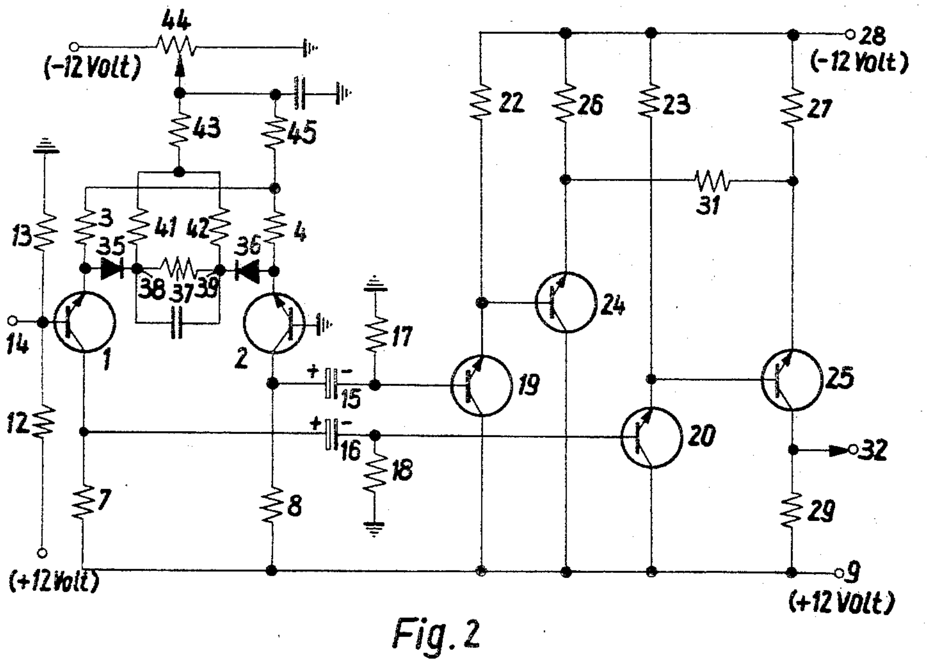

Features and advantages of the invention will become apparent from the following description, taken in conjunction with the accompanying drawings, comprising FIGURES 1 and 2, in which components shown in both figures are designated by the same reference numerals. In the drawings:

FIGURE 1 shows a circuit arrangement for varying the level of a video signal, in which the range of control of the signal level is represented by the ratio 1:3, and FIGURE 2 shows a circuit arrangement for varying the level of a video signal, in which the range of control of the signal level is represented by the ratio 1:5.

The circuit arrangement shown in FIGURE 1 comprises two emitter-coupled transistors 1 and 2, the emitters of which are returned by way of individual resistors 3, 4 and a common resistor 5 to a terminal 6, while the collectors are taken by way of respective load resistors 7, 8 to a supply terminal 9. In order to increase the stability of the circuit as regards differences in transistor characteristics due to manufacturing tolerances, the two emitters are connected together by a coupling resistor 11. The bias potential applied to the base of transistor 1 is determined by a potential divider comprising resistors 12 and 13 connected in series across a 12-volt supply.

The video signal of which the level is to be controlled is applied by way of an input terminal 14 to the base of transistor 1. The video signal is then passed on on the one hand from the collector of transistor 1 and on the other hand, and in the opposite phase, (because of the emitter-coupling) from the collector of transistor 2. A control voltage is applied to the circuit arrangement by way of terminal 6 to alter the working points of the transistors 1 and 2 and thus to alter the gains of the two transistors simultaneously and to the same extent. Thus both the levels and also the direct-current components of the signals appearing at the collectors of the transistors 1 and 2 are altered.

From the collectors of the transistors 1 and 2 the antiphased video signals are applied by way of capacitors 15 and 16 respectively and across resistors 17 and 18 respectively to the bases of driver transistors 19 and 20. The signals appearing across the respective emitter resistors 22, 23 of transistors 19 and 20 are applied directly to the bases of further emitter-coupled transistors 24, 25, the emitters of which are returned to a supply terminal 28 by way of individual resistors 26, 27 and are coupled by a resistor 31 connected between them. The collector of transistor 24 is taken directly to supply terminal 9, while that of transistor 25 is taken to terminal 9 by way of a load resistor 29, the signal appearing across which is fed out at an output terminal 32.

The antiphased video signals applied respectively to the base and to the emitter of transistor 25 are of approximately the same amplitude, so that a video signal of approximately twice that amplitude is provided at output terminal 32. The change in level effected by the control circuit thus has its full effect. On the other hand the alterations of the direct-current components effected by the control circuit cancel out, since these appear in the same phase at the base and at the emitter of transistor 25. Relatively rapid alterations in the control voltage thus effect only an alteration of the video signal level, but no alteration of the direct-current component of the video signal. Thus no control transients occur to give rise to disturbances in following amplifier stages.

Resistors 12 and 13 have values such that the base bias potential of transistor 1 is set to a value at which the mean working points of transistors 1 and 2 are slightly different, and that the video signal is transmitted approximately equally distorted over the two transistors 1 and 2. Since in the present case NPN transistors are employed as transistors 1 and 2, the base potential of transistor 1 is somewhat more positive than the base potential of transistor 2, which is held at earth potential. By this means differential amplitude distortion is substantially avoided.

The circuit arrangement of FIGURE 1 allows a range of control of 1:3 to be obtained while stringent requirements as to linearity are met. If a wide control range of some 1:5 and a higher stability with regard to spread in the characteristics of transistors 1 and 2 is to be attained, then the coupling resistor 11 may be replaced by a variable resistor, the value of this variable resistor being altered in inverse proportion to the instantaneous level of the video signal.

In a particular embodiment of the circuit arrangement described above in relation to FIGURE 1 the following component values were found to be suitable:

*Resistors*

| | | |
|---|---|---|
| 3, 4 | ohms | 470 |
| 5 | kilohms | 4.5 |
| 7, 8 | do | 1 |
| 12 | do | 220 |
| 13 | do | 2.2 |
| 17, 18 | do | 2.2 |
| 22, 23 | do | 2.2 |
| 26 | do | 2.2 |
| 27 | do | 2.7 |
| 29 | do | 2 |
| 31 | ohms | 150 |

*Transistors*

| | |
|---|---|
| 1, 2 | 2N708 |
| 19, 20 | ---- |
| 24, 25 | 2N708 |

*Capacitors*

| | | |
|---|---|---|
| 15, 16 | μf | 50 |

In the modified embodiment shown in FIGURE 2 the emitters of transistors 1 and 2 are connected with one another by way of a variable coupling impedance, which is formed by diodes 35, 36 and a resistor 37. This series combination corresponds to a variable resistance with a non-linear voltage/current characteristic. The junction points 38, 39 in which diodes 35 and 36 respectively meet resistor 37 are connected by way of individual resistors 41, 42 and by way of a common resistor 43 to the tapping of a potentiometer 44 which is connected across a direct-current supply providing a potential of −12 v. with respect to earth. In this manner the potential applied to points 38, 39 may be varied and the value of the series combination 35, 36, 37 correspondingly altered. The junction of the individual emitter resistors 3, 4 of transistors 1, 2 is also returned to the slider of potentiometer 44 by way of a resistor 45. Thus by altering the setting of the slider of potentiometer 44 there is simultaneously effected an alteration in the emitter potential of transistor 1 and 2 (by way of resistors 43, 3, 4) and on the other hand an alteration of the potential at the point 38, 39. In this manner the value of the series combination of variable resistance elements and resistance (diodes 35, 36 and resistor 37) may be arranged to vary in inverse proportion to the level of the video signal provided at the collectors of the transistors 1 and 2. The remainder of the circuit shown in FIGURE 2 is identical with that of FIGURE 1 and the description will therefore not be repeated.

What is claimed as new and desired to be secured by Letters Patent is:

1. Circuit arrangement for controlling the level of video signals containing signal level control means comprising in combination: a source of signals; a first pair of transistors each having an emitter, a base and a collector; first coupling means transferring signals between said emitters; a source of a variable control potential; means operable to vary said control potential; equal resistance means connecting each said emitter to said control source; load means connected to each said collector; circuit means applying said signal to one said base; a source of constant bias potential; circuit means connecting said one base to said bias source; a point at constant potential; circuit means connecting the other said base to said point; a second pair of transistors each having an emitter, a base and a collector; second coupling means transferring signals between last said emitters; third and fourth coupling means transferring signals from said collectors of said first transistor pair respectively to individual bases of said second transistor pair; further load means connected to one of last said collectors; an output terminal; and circuit means transferring signals from last said collector to said output terminal; whereby said output signal varies in level as said control voltage is varied.

2. Signal level control means as claimed in claim 1 wherein said bias potential differs from said constant potential such that antiphased signals transmitted by the transistors of said first pair are approximately equally distorted.

3. Signal level control means as claimed in claim 1, wherein said first coupling-means comprises variable resistance means having control means operable to vary the resistance value thereof; and wherein said resistance control means and said control potential varying means are coupled for simultaneous adjustment whereby said resistance value varies in inverse proportion to variation in the level of said output signal.

4. Signal level control means as claimed in claim 3, wherein said first coupling means includes the series combination of first and second diode means having preferred directions of current flow connected respectively to said emitters and resistance means having terminals connected respectively to said diode means; said diode means being connected in said series combination with opposed preferred directions; and further equal resistance means connecting each said resistance terminal to said control source.

5. Signal level control means as claimed in claim 4 wherein said control potential varying means comprises a potentiometer connected between the poles of a potential source and having its movable tapping connected both to said equal resistance means and to said further equal resistance means.

6. Signal level control means as claimed in claim 1, wherein each of said third and said fourth coupling means comprises a further transistor having a base, an emitter and a collector, a signal connection from the collector of the respective one of said first transistor pair to last said base, a direct connection from the last said emitter to the base of the respective one of said further transistor pair, a source of operating potential; resistance means connecting last said emitter to a pole of said source and a direct connection from last said collector to the other pole of said source.

7. Signal level control means as claimed in claim 6 wherein each said signal connection comprises a capacitor connected between said collector and said base, together with resistance means connecting said base to said constant potential point.

8. Signal level control means as claimed in claim 1 wherein each of said first and said second coupling means comprises a resistor.

9. Signal level control means as claimed in claim 1 wherein said equal resistance means comprises first and second resistors connecting each said emitter individually to a comomn point and a third resistor connecting said common point to said control source.

References Cited

FOREIGN PATENTS 1,175,278 8/1964 Germany.

ROY LAKE, *Primary Examiner.*

SIEGFRIED H. GRIMM, *Assistant Examiner.*

U.S. Cl. X.R.

330—29, 130; 325—405